US009215229B2

(12) United States Patent
Eicken et al.

(10) Patent No.: US 9,215,229 B2
(45) Date of Patent: *Dec. 15, 2015

(54) SYSTEMS AND METHODS FOR ESTABLISHING CLOUD-BASED INSTANCES WITH INDEPENDENT PERMISSIONS

(71) Applicant: RightScale Inc., Santa Barbara, CA (US)

(72) Inventors: Thorsten von Eicken, Santa Barbara, CA (US); Jose Maria Blanquer Gonzalez, Santa Barbara, CA (US); Raphael George Jacques Simon, Santa Barbara, CA (US)

(73) Assignee: Rightscale Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,159

(22) Filed: Jun. 27, 2014

(65) Prior Publication Data

US 2014/0317701 A1    Oct. 23, 2014

Related U.S. Application Data

(63) Continuation of application No. 14/137,226, filed on Dec. 20, 2013, now Pat. No. 8,769,644.

(60) Provisional application No. 61/786,948, filed on Mar. 15, 2013.

(51) Int. Cl.
*G06F 21/00* (2013.01)
*H04L 29/06* (2006.01)
*H04L 29/08* (2006.01)

(52) U.S. Cl.
CPC ............ *H04L 63/08* (2013.01); *H04L 63/0823* (2013.01); *H04L 67/1097* (2013.01)

(58) Field of Classification Search
None
See application file for complete search history.

(56) References Cited

U.S. PATENT DOCUMENTS

| 7,646,778 | B2 | 1/2010 | Sajassi |
| 8,190,740 | B2 | 5/2012 | Stienhans et al. |
| 8,438,654 | B1 | 5/2013 | Von Eicken et al. |
| 8,769,644 | B1 * | 7/2014 | Eicken et al. ............ 726/5 |

(Continued)

OTHER PUBLICATIONS

International Search Report & Written Opinion on PCT/US2014/024444 dated Aug. 12, 2014.

(Continued)

*Primary Examiner* — Lisa Lewis
*Assistant Examiner* — Maung Lwin
(74) *Attorney, Agent, or Firm* — Foley & Lardner LLP; John D. Lanza

(57) ABSTRACT

A method and system for facilitating management of cloud-based service instances, the system including one or more computing systems configured to communicate with at least one multi-tenant computing cloud, and configured to establish a cloud-based service instance hosted in the multi-tenant computing cloud and an access entity with permissions to access the established cloud-based service instance. The system can receive a request for the cloud-based service instance, the request authenticated as originating from a requestor; consult a set of access controls associated with the cloud-based service instance; determine, responsive to the consulting, if the request is allowable by the requestor; and enable, responsive to determining that the request is allowable by the requestor, the requestor to complete the request using a restricted access credential associated with the access entity.

32 Claims, 3 Drawing Sheets

(56) References Cited

U.S. PATENT DOCUMENTS

| | | | |
|---|---|---|---|
| 9,137,131 B1* | 9/2015 | Sarukkai | H04L 43/0876 |
| 2009/0228967 A1* | 9/2009 | Gbadegesin | H04L 63/0807 |
| | | | 726/8 |
| 2011/0231899 A1* | 9/2011 | Pulier | G06F 9/45558 |
| | | | 726/1 |
| 2012/0047239 A1* | 2/2012 | Donahue | G06F 9/5072 |
| | | | 709/220 |
| 2012/0109947 A1* | 5/2012 | Yu et al. | 707/725 |
| 2012/0130781 A1* | 5/2012 | Li | 705/14.4 |
| 2012/0185913 A1 | 7/2012 | Martinez et al. | |
| 2012/0221690 A1 | 8/2012 | Beaty et al. | |
| 2012/0222106 A1 | 8/2012 | Kuehl | |
| 2012/0254957 A1* | 10/2012 | Fork | G06F 21/33 |
| | | | 726/6 |
| 2012/0272249 A1* | 10/2012 | Beaty | G06F 9/5083 |
| | | | 719/318 |
| 2012/0290702 A1* | 11/2012 | Vincent | 709/223 |
| 2012/0304233 A1 | 11/2012 | Roberts et al. | |
| 2012/0324069 A1 | 12/2012 | Nori et al. | |
| 2012/0331118 A1 | 12/2012 | Stein et al. | |
| 2013/0018952 A1 | 1/2013 | McConnell et al. | |
| 2013/0060839 A1* | 3/2013 | Van Biljon | G06Q 30/04 |
| | | | 709/203 |
| 2013/0066945 A1 | 3/2013 | Das et al. | |
| 2013/0080642 A1* | 3/2013 | Adam | G06F 15/173 |
| | | | 709/226 |
| 2013/0263209 A1 | 10/2013 | Panuganty | |
| 2014/0006580 A1 | 1/2014 | Raghu | |
| 2014/0013409 A1* | 1/2014 | Halageri | H04L 63/0815 |
| | | | 726/8 |
| 2014/0032764 A1 | 1/2014 | Akolkar et al. | |
| 2014/0075239 A1* | 3/2014 | Prathipati et al. | 714/4.1 |
| 2014/0075565 A1 | 3/2014 | Srinivasan et al. | |
| 2014/0222493 A1* | 8/2014 | Mohan | G06Q 10/06316 |
| | | | 705/7.26 |
| 2014/0223576 A1* | 8/2014 | Zhao | 726/27 |

OTHER PUBLICATIONS

Notice of Allowance on U.S. Appl. No. 14/137,226 dated May 28, 2014.

Office Action on U.S. Appl. No. 14/137,226 dated Apr. 2, 2014.

* cited by examiner

300

Establish a cloud-based service instance
hosted in a multi-tenant computing cloud
and an access entity with permissions
to access the established cloud service instance.
310

Receive a request for the cloud-based service instance,
the request authenticated as originating from a requestor.
330

Consult a set of access controls
associated with the cloud-based service instance and
determine if the request is allowable by the requestor.
350

Enable the requestor to complete the request using a restricted access
credential associated with the access entity.
370

Figure 3

SYSTEMS AND METHODS FOR ESTABLISHING CLOUD-BASED INSTANCES WITH INDEPENDENT PERMISSIONS

CROSS REFERENCE TO RELATED APPLICATIONS

This U.S. patent application is a continuation of, and claims priority to, U.S. patent application Ser. No. 14/137,226, titled "Systems and Methods for Establishing Cloud-Based Instances with Independent Permissions," filed Dec. 20, 2013, which claims priority to U.S. Patent Application No. 61/786,948, titled "Systems and Methods for Establishing Cloud-Based Instances with Independent Permissions," filed Mar. 15, 2013, which are each incorporated herein by reference.

BACKGROUND

The present disclosure relates generally to managing cloud-based virtual servers and service instances hosted by multi-tenant cloud computing service providers. Multi-tenant cloud computing service providers generally allow a customer to instantiate virtual servers running software specified by the customer without requiring the customer to own or manage the underlying hardware. Multi-tenant cloud computing service providers may therefore be referred to as hosts or host providers. Hosts providers include, for example, Amazon.com, Inc. (e.g., Amazon Web Services), Rackspace Hosting, Inc. (e.g., Rackspace Cloud), Google Inc. (e.g. Google Compute Engine), and Microsoft Corp. (e.g., Windows Azure).

SUMMARY

Aspects and embodiments of the present disclosure are directed to systems and methods of facilitating management of cloud-based service instances. In general, in some embodiments, a management system is configured to communicate with at least one multi-tenant computing cloud. The management system can establish a cloud-based service instance hosted in the multi-tenant computing cloud and an access entity with permissions to access the established cloud service instance. The management system can receive a request for the cloud-based service instance from an authenticatable requestor and consult a set of access controls associated with the cloud-based service instance to determine if the request is allowable by the requestor. The management system can enable, or facilitate, an authorized authenticated request to the multi-tenant computing cloud using an access credential associated with the access entity.

At least one aspect is directed to methods of facilitating management of cloud-based service instances, the methods comprising establishing, by a cloud management service configured to communicate with a multi-tenant computing cloud, a cloud-based service instance hosted in the multi-tenant computing cloud and an access entity with permissions to access the established cloud service instance; receiving, by the cloud management service, a request for the cloud-based service instance, the request authenticated as originating from a requestor; consulting, by the cloud management service, a set of access controls associated with the cloud-based service instance; determining, by the cloud management service, responsive to the consulting, if the request is allowable by the requestor; and enabling, by the cloud management service responsive to determining that the request is allowable by the requestor, the requestor to complete the request using an access credential associated with the access entity.

The methods may further include communicating, by the cloud management service, with the multi-tenant computing cloud, to create, start, instantiate, discover, identify, duplicate, import, configure, or generate, the cloud-based service instance. The methods may include storing, by the cloud management service, the access credential for the access entity.

The methods may include returning, to the requestor, the access credential associated with the access entity, wherein the request is a request for direct access, by the requestor, to the cloud-based service instance. The methods may include forwarding the request to the multi-tenant computing cloud, with the access credential associated with the access entity, wherein the request is a request to perform an action on the cloud-based service instance. The method may include, prior to forwarding the request, converting the request from a first request structure, format, or language, into a second request structure, format, or language.

The methods may include creating a new access entity with a new access credential and configuring the access entity's permissions in the multi-tenant compute cloud such that the access entity only has access to the cloud-based service instance being accessed by the requestor.

At least one aspect is directed to a system for facilitating management of cloud-based service instances, the system comprising one or more computing systems configured to communicate with at least one multi-tenant computing cloud, the one or more computing systems configured to establish a cloud-based service instance hosted in the multi-tenant computing cloud and an access entity with permissions to access the established cloud service instance; receive a request for the cloud-based service instance, the request authenticated as originating from a requestor; consult a set of access controls associated with the cloud-based service instance; determine, responsive to the consulting, if the request is allowable by the requestor; and enable, responsive to determining that the request is allowable by the requestor, the requestor to complete the request using an access credential associated with the access entity.

The systems may be further configured to establish the cloud-based service instance by communicating with the multi-tenant computing cloud to create, start, instantiate, discover, identify, duplicate, import, configure, or generate, the cloud-based service instance. The systems may be further configured to store the access credential for the access entity.

The systems may be further configured to return, to the requestor, the access credential associated with the access entity, wherein the request is a request for direct access, by the requestor, to the cloud-based service instance. The systems may be further configured to forward the request to the multi-tenant computing cloud, with the access credential associated with the access entity, wherein the request is a request to perform an action on the cloud-based service instance. The systems may, prior to forwarding the request, convert the request from a first request structure, format, or language, into a second request structure, format, or language.

The systems may be further configured to create a new access entity with a new access credential and configuring the access entity's permissions in the multi-tenant compute cloud such that the access entity only has access to the cloud-based service instance being accessed by the requestor.

The cloud-based service instance may provide one of a database, a load balancer, a message queue, a communication channel, and data storage. The cloud-based service instance may be a virtual service provided in the multi-tenant computing cloud. The access entity permissions may be restricted to only allow access to the established cloud service instance. The cloud-based service instance may be associated with a resource pool comprising one or more cloud-based service instances and the access entity permissions may be restricted to only accessing cloud-based service instances in the resource pool. The authenticated request may be cryptographically signed by one or more of the requestor, an authentication service, and a third-party signing authority.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is a flowchart for a method of facilitating management of cloud-based service instances.

DETAILED DESCRIPTION

Figure 1:
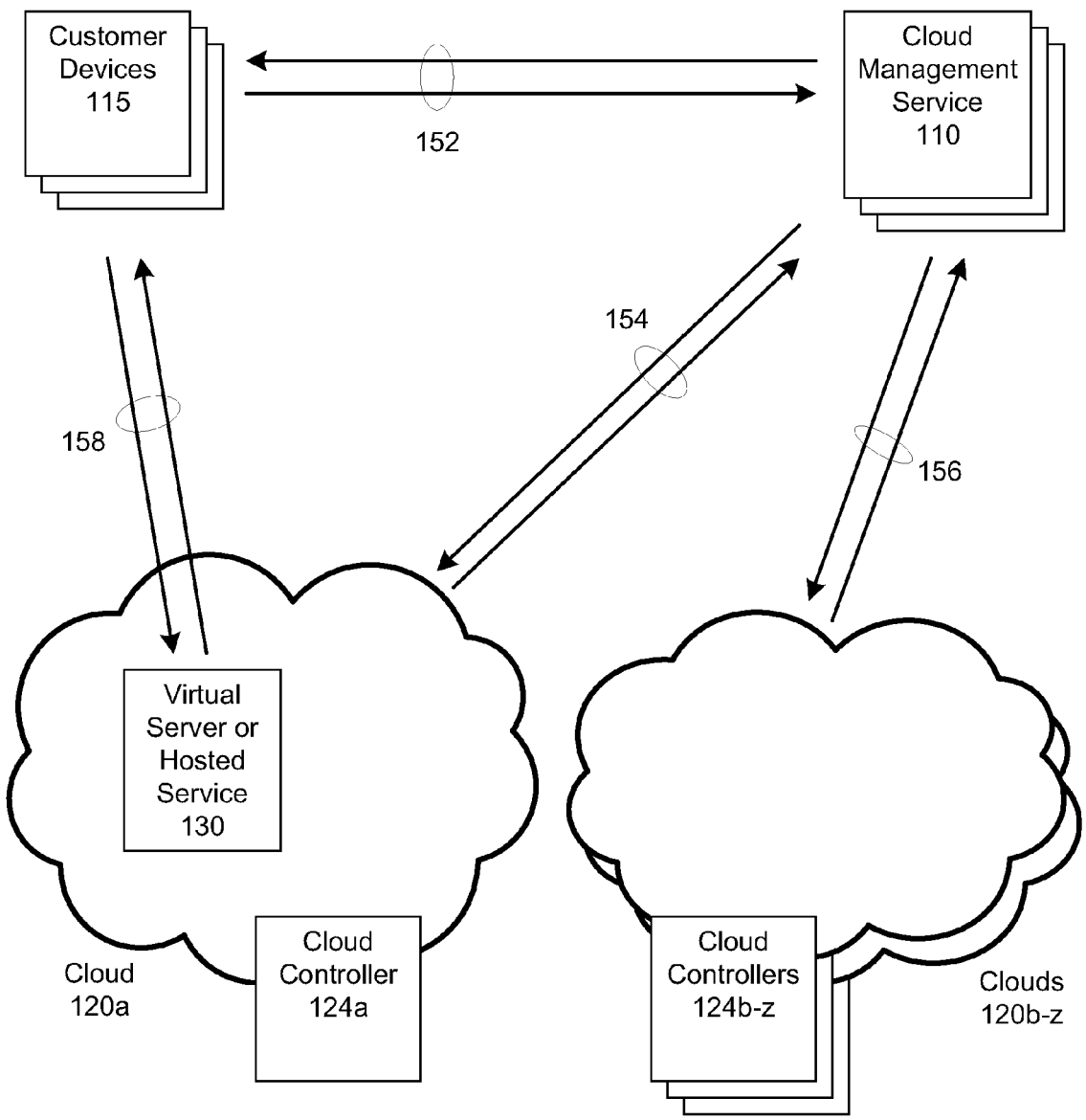
FIG. 1 is a block diagram illustrating an example network.

FIG. 1 is a block diagram illustrating an example environment including third-party multi-tenant computing clouds, virtual servers and services operating in the computing clouds, and a cloud management service. In brief overview, a customer device 115 interacts with a cloud management service 110, or more simply "manager" 110. The manager 110 is designed to interact with multiple multi-tenant computing clouds 120a-z, each provided by one of many possible cloud providers and managed via cloud controllers 124a-z. Each cloud 120 hosts one or more virtual servers and hosted services 130. Communication between each participant is facilitated by a communication channel, e.g., the customer device 115 may communicate with the manager 110 via a channel 152 such as the Internet. The manager may communicate with a first cloud 120a via a private dedicated channel 154 and communicate with other clouds 120b-z via another channel 156. In general, the cloud management service 110 may communicate with a cloud controller 124 (e.g., to allocate or deallocate a virtual server or service) and the cloud management service 110 may communicate with virtual servers or services in a cloud 130. In some embodiments, the customer device 115 may be enabled to communicate with a virtual server or hosted service 130 via a direct channel 158, such as an encrypted secure tunnel operating over the Internet. A customer device 115 may communicate with virtual servers or services 130 and, in some embodiments, with a cloud controller 124.

The multi-tenant cloud computing service providers generally provide a computing platform, e.g., cloud controllers 124a-z, that enables a customer to instantiate and use one or more virtual servers in various different configurations matching the particular needs of the customer. A customer may configure, use, or manipulate these services and servers to meet the customer's needs. A customer may be an individual or an organization, e.g., a corporate entity. Host providers typically characterize a customer as an account, such that the servers and services for a customer are scoped within a single account. A customer may have one or more users authorized for the account. In the general case, each user is represented by an access entity, which is a formal encoding of the user's identity, e.g., using an email address, a user ID, an account ID, or some combination thereof. A user may provision, configure, or use the virtual servers and services hosted by the multi-tenant cloud computing service provider, e.g., by issuing requests to the host provider. For example, the user may submit a request to a cloud controller 124a-z using a protocol such as HTTP or HTTPS. The host provider generally authenticates a request using a set of access credentials associated with an access entity submitting the request. The authentication may be performed by the cloud controller 124, acting as a sort of gatekeeper. For example, a user may confirm an access entity by supplying a username and password, e.g., at the beginning of an authenticated session. Some host providers use key-id/secret-key pairs or public/private key pairs for authentication. An access entity may have multiple access credentials. For example, Amazon Web Services allows two key-id/secret-key pairs. Additionally, an account may have multiple access entities. For example, Amazon Web Services allows a large number of users to access an account via the Identity and Access Management (IAM) feature set. Typically, when a host provider supports multiple access entities per account, each access entity may have different rights or permissions.

Multi-tenant cloud computing service host providers generally also enable a customer to launch various services related to the virtual servers and other services in the cloud. These services may be described as virtual services or hosted services. As an example of such services, Amazon.com, Inc., provides the Amazon Elastic Compute Cloud (Amazon EC2), Amazon Simple Storage Service (Amazon S3), and Amazon Relational Database Service (Amazon RDS). These hosted or virtual services generally relate to, and interact with, the virtual servers used by a customer. For example, Amazon Elastic MapReduce (Amazon EMR) is a web service that enables Amazon's customers to process large amounts of data. As Amazon.com, Inc., explains: "It [EMR] utilizes a hosted Hadoop framework running on the web-scale infrastructure of Amazon Elastic Compute Cloud (Amazon EC2) and Amazon Simple Storage Service (Amazon S3)." (http://aws.amazon.com/elasticmapreduce/).

There is a distinction between the services provided or hosted by a host provider and a particular instance of a service. That is, many virtual services allow a user to create multiple instances of the service, where each instance provides the same type of functionality but independently from one another. For example, each "load balancer" (a virtual service instance) in ELB (a virtual service) is configured independently and operates independently of other load balancers. Similarly, each RDS database instance is independent of other RDS instances, but they are all part of the RDS service. In the case of S3, each "bucket" represents a separate storage instance. Access to individual service instances can be controlled.

Referring to FIG. 1 in greater detail, the manager 110 may comprise any computer device capable of interacting with one or more multi-tenant computing clouds 120a-z and cloud controllers 124a-z. The manager 110 may comprise a single server, server cluster, or virtual servers (e.g., cloud based servers). In some embodiments, the manager 110 may be operated independently from the cloud service host providers, that is, the cloud management service 110 may interact with third-party clouds. In some embodiments, the manager 110 may have one or more associated databases for storing configuration information and/or virtual server images. The manager 110 may be communicatively connected to private networks and/or public networks such as the Internet. The manager may include a daemon running to monitor one or more servers or services operating in a cloud. In some embodiments, the manager records the data generated by the daemon to a database, which may be local, operated on the network, or provided by a cloud-based service.

Generally, the manager 110 is capable of interacting with a cloud provider to set up a customer account and any access entities such as an administrative entity, subscriber profile, or user identity. While access entities may have different names or descriptions in practice across different providers, they are referred to herein as an "access entity" to avoid any confusion between an umbrella customer account and individual users of a customer account. A subscriber may have multiple access entities with a single provider, for example, an access entity for each of the subscriber's employees. Each access entity may have its own associated authentication credentials. Each access entity may have its own associated permissions or restrictions. For example, a customer may have an access entity authorized to make changes and a second access entity only authorized for read-only operations.

Generally, the manager 110 is capable of interacting with a cloud provider to instantiate cloud-based services and virtual servers hosted by the cloud. The interaction may be in the form of a request from the manager 110 to the cloud provider or to a service operated by the cloud provider. The interaction may be in the form of steps performed by the manager 110. In some embodiments, the manager 110 is further capable of modifying an instantiated cloud-based service or virtual server, e.g., pausing a service or updating a virtual server. In some embodiments, the manager 110 converts between a standardized instruction set and instruction sets tailored to each cloud host.

The customer, or representatives of the customer, may access or communicate with the manager 110 via a customer device 115 over a communication channel 152. The customer device 115 may be a server, a virtual machine, a desktop computer, a laptop computer, a mobile computing device, or any other computing platform from which a customer or customer agent may interact with the manager 110. The customer device 115 or the manager 110 may also be virtual servers running in one of the virtual compute clouds 120a-z. The communication channel 152 may be wired or wireless. The communication channel 152 may operate over an intranet, a private network, a public network, or encrypted private channels over a public network. In some embodiments, the manager 110 presents an API (Application Programming Interface) via the communication channel 152 to the customer device 115. In some embodiments, the interface presented by the manager 110 is a web interface or website. In some embodiments, the customer device 115 executes software configured to communicate with the manager 110.

Each cloud 120 is hosted by a cloud provider and directly managed by a cloud controller 124. Each cloud 120a-z may be a multi-tenant cloud, that is, each cloud host may sell cloud based services to multiple parties or tenants. Multi-tenant cloud computing service providers include, for example, Amazon.com, Inc. (e.g., Amazon Web Services), Rackspace Hosting, Inc. (e.g., Rackspace Cloud), Google Inc. (e.g. Google Compute Engine), and Microsoft Corp. (e.g., Windows Azure). Providers generally host servers and services that enable customers to instantiate a number of virtual servers in a variety of different configurations to match their needs and to launch various services related to the virtual servers. For example, Amazon.com, Inc., provides virtual servers in the Amazon Elastic Compute Cloud (Amazon EC2), and it provides services in Amazon Simple Storage Service (Amazon S3), Amazon Elastic Load Balancer (ELB), Amazon Dynamo DB, and Amazon Relational Database Service (Amazon RDS).

A cloud-based service 130 may be established by the cloud controller 124a or by the cloud manager 110. For example, a customer may access the manager 110, e.g., via device 115 and communication channel 152, and request that a service be established. The manager 110 coordinates instantiation of a cloud-based service 130 in a cloud 120a. The customer may then use the manager 110 to monitor the cloud-based service instance 130 and to handle any other service oriented requests. In some embodiments, the manager 110 provides the customer device 115 with a token or access entity credentials enabling the customer device 115 to communicate directly with the service 130, e.g., via communication channel 158.

The user device 115, manager 110, and clouds 120a-z, may be connected in any manner, and via any network or networks. The channels 152, 154, 156, 158, illustrated in FIG. 1 may comprise the Internet, local networks, web servers, file servers, routers, databases, computers, servers, network appliances, or any other computing devices capable of sending and receiving information. A network may comprise computing devices connected via cables, infrared ports, wireless signals, or any other means of connecting multiple computing devices. A network and any devices connected to the networks may communicate via any communication protocol used to communicate among or within computing devices, including without limitation SSL, BitTorrent, HTML, XML, RDP, ICA, FTP, HTTP, SIP, XMPP (also known as Jabber), TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g, IEEE 802.11n, WiMax and direct asynchronous connections, or any combination and/or extensions thereof. The network may comprise mobile telephone networks utilizing any protocol or protocols used to communicate among mobile devices, including AMPS, TDMA, CDMA, GSM, GPRS or UMTS.

Figure 2A:
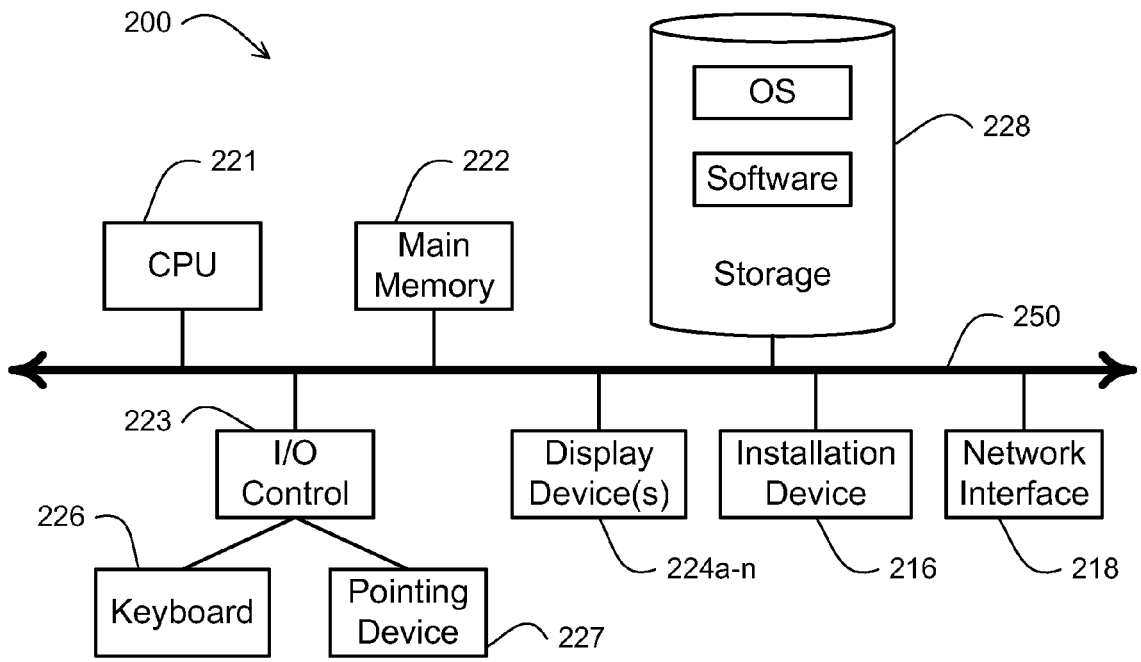
FIGS. 2A and 2B are block diagrams of a typical computer 200 useful as client computing devices and server computing devices.
Figure 2B:
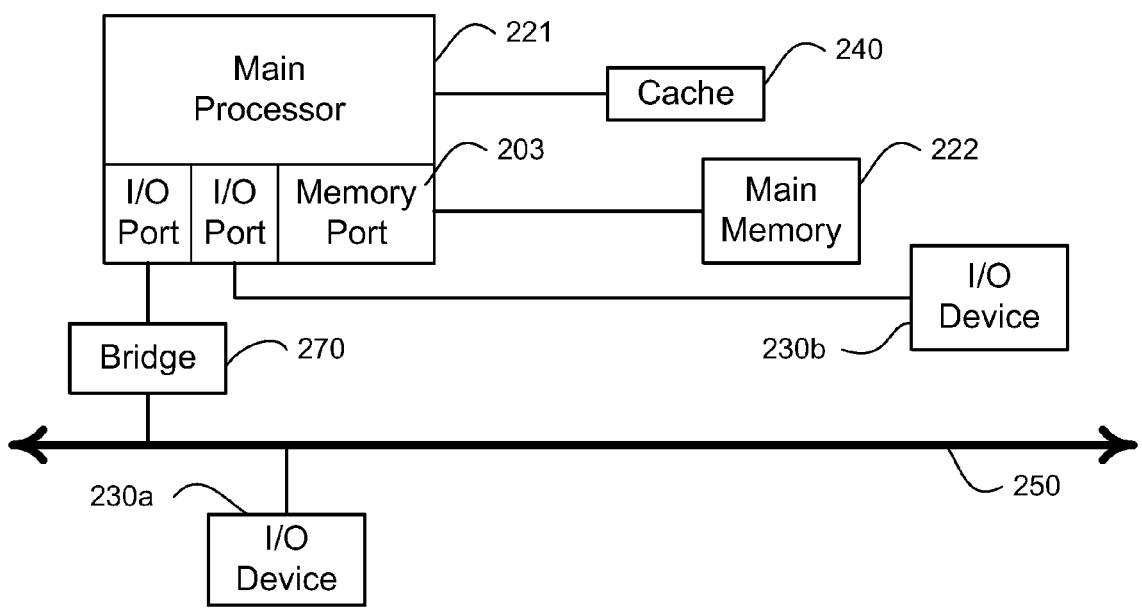

FIGS. 2A and 2B depict block diagrams of a computing device 200 useful for practicing an embodiment of the computing devices illustrated in FIG. 1. Each may be deployed as and/or executed on any type and form of computing device, such as a mobile platform, personal computer, server, network device, or appliance capable of communicating on any type and form of network and performing the operations described herein. As shown in FIGS. 2A and 2B, each computing device 200 includes a central processing unit 221, and a main memory unit 222. As shown in FIG. 2A, a computing device 200 may include one or more visual display devices 224a-n, a keyboard 226 and/or a pointing device 227, such as a mouse. As shown in FIG. 2B, each computing device 200 may also include additional optional elements, such as one or more input/output devices 230a-230b (generally referred to using reference numeral 230), and a cache memory 240 in communication with the central processing unit 221.

The central processing unit 221 is any logic circuitry that responds to and processes instructions fetched from the main memory unit 222. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The central processing unit 221 may be a single core or multi-core. The central processing unit 221 may comprise one or more processors.

Main memory unit 222 may be one or more memory chips capable of storing data and allowing any storage location to be directly accessed by the microprocessor 221, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC200 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 may be based on any of the above described memory chips, or any other available memory chips capable of operating as described herein. In the embodiment shown in FIG. 2A, the processor 221 communicates with main memory 222 via a system bus 250 (described in more detail below). FIG. 2B depicts an embodiment of a computing device 200 in which the processor communicates directly with main memory 222 via a memory port 203. For example, in FIG. 2B the main memory 222 may be DRDRAM.

FIG. 2B depicts an embodiment in which the main processor 221 communicates directly with cache memory 240 via a secondary bus, sometimes referred to as a backside bus. In other embodiments, the main processor 221 communicates with cache memory 240 using the system bus 250. Cache memory 240 typically has a faster response time than main memory 222 and is typically provided by SRAM, BSRAM, or EDRAM. In the embodiment shown in FIG. 2B, the processor 221 communicates with various I/O devices 230 via a local system bus 250. Various buses may be used to connect the central processing unit 221 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 221 may use an Advanced Graphics Port (AGP) to communicate with the display 224. FIG. 2B depicts an embodiment of a computer 200 in which the main processor 221 communicates directly with I/O device 230b via HyperTransport, Rapid I/O, or InfiniBand. FIG. 2B also depicts an embodiment in which local busses and direct communication are mixed: the processor 221 communicates with I/O device 230a using a local interconnect bus while communicating with I/O device 230b directly.

The computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 200 may further comprise a storage device, such as one or more hard disk drives or redundant arrays of independent disks, Flash memory, or EEPROMs, for storing an operating system and other related software, and for storing application software programs. Optionally, any of the installation devices 216 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 200 may include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols. In one embodiment, the computing device 200 communicates with other computing devices 200 via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 218 may comprise a built-in network adapter, network interface card, PCMCIA network card, card bus network adapter, wireless network adapter, USB network adapter, modem or any other device suitable for interfacing the computing device 200 to any type of network capable of communication and performing the operations described herein.

A wide variety of I/O devices 230a-230n may be present in the computing device 200. Input devices include keyboards, mice, trackpads, trackballs, microphones, touch screens, and drawing tablets. Output devices include video displays, touch screens, speakers, inkjet printers, laser printers, and dye-sublimation printers. The I/O devices may be controlled by an I/O controller 223 as shown in FIG. 2A. The I/O controller may control one or more I/O devices such as a keyboard 226 and a pointing device 227, e.g., a mouse or optical pen. Furthermore, an I/O device may also provide storage and/or an installation medium 216 for the computing device 200. In still other embodiments, the computing device 200 may provide USB connections to receive handheld USB storage devices such as the USB Flash Drive line of devices manufactured by Twintech Industry, Inc. of Los Alamitos, Calif.

In some embodiments, the computing device 200 may comprise or be connected to multiple display devices 224a-224n, which each may be of the same or different type and/or form. As such, any of the I/O devices 230a-230n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 200, for example, via a network. These embodiments may include any type of software designed and constructed to use another computer's display device as a second display device 224a for the computing device 200. One ordinarily skilled in the art will recognize and appreciate the various ways and embodiments that a computing device 200 may be configured to have multiple display devices 224a-224n.

In further embodiments, an I/O device 230 may be a bridge between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 200 of the sort depicted in FIGS. 2A and 2B typically operates under the control of operating systems, which control scheduling of tasks and access to system resources. The computing device 200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 200 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 102 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif., or the IPHONE family of devices manufactured by Apple Computer. In still further embodiments, the mobile device is a cellular telephone that operates under control of the PocketPC operating system, such as the MPx200, manufactured by Motorola Corp. In still other embodiments, a mobile device may comprise a mobile gaming device with wireless communication capability. A typical mobile device may comprise many of the elements described above in FIGS. 2A and 2B, including the processor and the main memory.

FIG. 3 is a flowchart for a method of facilitating management of cloud-based service instances. In some embodiments, the method 300 is performed by the cloud management service 110 or components responsive thereto. The manager 110 is configured to communicate with a multi-tenant computing cloud 120a-z. At step 310, the manager 110 establishes a cloud-based service instance 130 hosted in the multi-tenant computing cloud 120a and an access entity with permissions to access the established cloud service instance 130. At step 330, the manager 110 receives a request for the cloud-based service instance, the request authenticated as originating from a requestor, e.g., customer device 115. At step 350, the manager 110 consults a set of access controls associated with the cloud-based service instance and determines if the request is allowable by the requestor. At step 370, the manager 110 enables the requestor to complete the request using a restricted access credential associated with the access entity.

At step 310, in more detail, the manager 110 establishes a cloud-based service instance 130 hosted in the multi-tenant computing cloud 120a and an access entity with permissions to access the established cloud service instance. In some embodiments, the access entity is established concurrently with the cloud-based service instance. In some embodiments, a pre-existing access entity is granted permissions, or identified to have sufficient permissions, to access a newly established cloud-based service instance. For example, the cloud-based service instance may be grouped together with other instances and a single access entity may be granted permissions to every instance in the group. The cloud-based service instance may participate in a resource pool comprising one or more cloud-based service instances. A resource pool may also be described as a collection of resources or a deployment. In some embodiments multiple access entities, e.g., for multiple requestors, are each granted permissions to access the newly established cloud-based service instance. In some embodiments, a new access entity is created with permissions specific to the newly established cloud-based service instance. A requestor may utilize multiple access entities. In some embodiments, an access entity's permissions are restricted to only accessing cloud-based service instances in a particular resource pool. Credentials for a new access entity, e.g., an access identity name and password, may be set by the manager 110 or the cloud controller 124. In some embodiments, the manager provides an access identity name and the host generates a new password, which the manager stores in association with the identity name. In other embodiments, credentials for a new access entity consist of a private/public key pair or a key identifier and a cryptographic key.

In some embodiments, the manager 110 establishes the cloud-based service instance 130 by communicating with the multi-tenant computing cloud 120a. For example, the manager 110 may submit instructions to create, start, instantiate, discover, identify, duplicate, import, configure, or generate, the cloud-based service instance. The instructions may be received by a server or service operated by the cloud host. In some embodiments, the manager 110 submits a single instruction. In some embodiments, the manager 110 submits multiple instructions. For example, the manager 110 may establish an access entity separately from establishing the cloud-based service instance. The instructions may be submitted using an application programming interface (API) specific to the cloud or cloud provider. In some embodiments, multiple access entities are created for a cloud-based service instance.

Examples of the cloud-based services include a service providing a database, a load balancer, a message queue, a communication channel, or data storage. For example, Amazon.com, Inc., provides the Amazon Simple Storage Service (Amazon S3), Amazon Elastic Load Balancing service (Amazon ELB), and Amazon Relational Database Service (Amazon RDS). Some cloud-based service instances may interact with other cloud-based service instances. For example, Amazon.com, Inc., provides the Amazon Elastic Load Balancer (Amazon ELB), which automatically distributes incoming application traffic across multiple virtual server instances in the Amazon Elastic Compute Cloud (Amazon EC2). The manager 110 may establish multiple Amazon EC2 instances and an Amazon ELB instance to load balance the EC2 instances. Each instance may be established with an instance-specific access entity. In some embodiments, the cloud-based service instance is a virtual service provided in the multi-tenant computing cloud. For example, the service may be provided by a server, or virtual server, operated by the cloud host and these servers are typically hidden from the user behind the service's interface. In some embodiments, a service may be exposed as if it were a virtual servers that can be accessed individually. For example, Amazon Elastic Map Reduce (EMR), may be exposed as a server even though it is a service.

At step 330, the manager 110 receives a request for the cloud-based service instance, the request authenticated as originating from a requestor. The request may be described as an authenticated request because the origin of the request can be authenticated as coming from a requestor known to, or previously authenticated by, the manager 110. In some embodiments, the request is authenticated or verified by the manager 110. In some embodiments, the authenticity of the request from the requestor is verified using a cryptographic signature. The authenticated request may be cryptographically signed by one or more of the requestor, an authentication service, and a third-party signing authority. In some embodiments, the manager 110 uses a key to decrypt the message, a hash value associated with the message, or a signature token accompanying the message. In some embodiments, the message is authenticated by virtue of arriving via a secured trusted channel, e.g., on a private network.

There are several known techniques for signing a message. The entire message may be encrypted or the message may be processed using a hash function to generate a short digest ("hash value") that may then be encrypted and bundled with the original message. In some embodiments, a sender obtains a certificate from a trusted thirty party for use in authentication. The certificate generally includes an identifier for the sender and a public key for the sender. The certificate may also include additional information such as a date stamp. The certificate, or a hash value of the certificate, may be encrypted using a private key controlled by the third party as evidence that the certificate was issued by the third party. The sender encrypts the message, or a hash value of the message, using a private key controlled by the sender and corresponding to the public key in the certificate. A recipient of the encrypted message or hash value, possessing the certificate, can verify the certificate with the trusted third-party and can use the public key included in the certificate to verify that the message was sent by the party identified in the certificate. The certificate need not be sent with every message. For example, the certificate may have a period of presumed validity based on the date stamp. Other methods of authenticating the source of a message can also be used, such as a one-time key, a challenge-response exchange, or participation in a trust network.

At step 350, the manager 110 consults a set of access controls associated with the cloud-based service instance and determines if the request is allowable by the requestor. The cloud-based service instance is associated with a set of access controls, e.g., an access control list. The access controls indicate if the requestor of an authenticated request is authorized to make the request. The manager 110 determines if the request is authorized. For example, a requestor may be authorized to collect statistics or perform read-only operations but not to make changes. If a request is both authenticated and authorized then the manager 110 will facilitate the request. The access controls may be stored by the manager 110. The access controls may be stored in a database or data storage system accessible by the manager 110, e.g., over a network. The access controls may be structured in a hierarchy. Each cloud-based service instance may have a set of access controls specific to the respective instance. Cloud-based service instances may be grouped together (for example into a "deployment") and have a single set of access controls for the group.

A request received by the manager 110 may be a request to collect monitoring data, configure or modify settings, read data, write data, perform a query, en-queue or de-queue a message, apply settings from a batch or script, upload or run a script, execute custom code, establish a service, duplicate a server, associate a service instance with a resource pool, group service instances into a resource pool, pause a service, terminate a service or server, or any other request that impacts a cloud-based server or service instance.

At step 370, the manager 110 enables the requestor to complete the request using an access credential associated with an access entity. In some embodiments, the access entity may be identified by the requestor. In some embodiments, the access entity may be selected by the manager 110. The access entity may be selected based on the identity of the requestor. The access entity may be based on the nature of the request. For example, an access entity with fewer rights or privileges may be used where the request does not require more substantial rights. That is, a request to retrieve data does not necessarily require an access entity with administrative rights and the manager 110 may therefore use a non-administrative access entity. The access entity may be selected based on the virtual servers or services to be accessed by the request. For example, an access entity that only has rights to access a single server might be used for access to that server, where no other access is needed. Thus the access entity may be selected by the manager 110 that best suits the requirements of the request.

In some embodiments, the manager 110 may create a new access entity with a new access credential and configure the access entity's permissions in the multi-tenant compute cloud such that the access entity only has access to the cloud-based virtual servers and/or cloud-based service instances being accessed in the request. The access entity may be created to narrowly enable the requestor to perform the request while not providing the requestor any access not necessary to the request. The new access entity may be disabled or deleted upon completion of the request. The new access entity may be disabled or deleted after a period of time has passed.

The manager 110 only enables a request that originated with a verified requestor authorized to make the request. In some embodiments, the manager passes the authenticated authorized request to the cloud host or cloud-based service instance. The manager may convert the request from a first request language or format into a second request language or format tailored to the destination cloud-based service instance or cloud host. In some embodiments, the manager 110 performs the authenticated authorized request. In some embodiments, the manager 110 returns a token or credential to the requestor, enabling the requestor to communicate directly with the cloud-based service instance to complete the request. The token may be a single use or one-time credential. In some embodiments, the manager 110 subsequently alters the credential, e.g., changes the password, to terminate or revoke a credential returned to the requestor. The manager 110 may revoke the credential after a fixed period of time, i.e., the credential may expire. The manager 110 may revoke the credential responsive to a completion event indicating that the requestor is no longer using the credential.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer-readable storage media for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple DVDs, CDs, disks, or other storage devices).

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The systems described can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a LCD (liquid crystal display) monitor, LED or OLED screen, a CRT (cathode ray tube), a plasma screen, or a projector, for displaying information to the user and a touch screen, keyboard, or a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an embodiment of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing systems described can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements. References to "or" may be construed as inclusive so that any terms described using "or" may indicate any of a single, more than one, and all of the described terms.

Thus, particular embodiments of the subject matter have been described. Other embodiments are within the scope of the following claims.

What is claimed is:

1. A method of facilitating management of cloud-based service instances, the method comprising:
   receiving, by a cloud management service configured to communicate with a multi-tenant computing cloud, a request to perform an action on a cloud-based service instance hosted in the multi-tenant computing cloud, the request authenticated as originating from a requestor;
   determining, by the cloud management service, that the request is allowable by the requestor based on a set of access controls associated with the cloud-based service instance; and
   enabling, by the cloud management service responsive to determining that the request is allowable, the requestor to complete the request using an access credential associated with an access entity with permissions to access the cloud-based service instance by forwarding the request to the multi-tenant computing cloud with the access credential associated with the access entity.

2. The method of claim 1, wherein the access entity permissions are restricted to allow access only to the established cloud service instance.

3. The method of claim 1, wherein the cloud-based service instance is associated with a resource pool comprising one or more cloud-based service instances and the access entity permissions are restricted to only accessing cloud-based service instances in the resource pool.

4. The method of claim 1, wherein the cloud-based service instance provides one of a database, a load balancer, a message queue, a communication channel, and data storage.

5. The method of claim 1, wherein the cloud-based service instance is a virtual service provided in the multi-tenant computing cloud.

6. The method of claim 1, further comprising
   establishing, by the cloud management service, responsive to determining that the request is allowable by the requestor, a custom access entity with permissions sufficient to perform the request,
   wherein enabling the requestor to complete the request comprises enabling the requestor to complete the request using an access credential associated with the custom access entity.

7. The method of claim 1, further comprising establishing the cloud-based service instance by submitting, by the cloud management service to multi-tenant computing cloud, instructions to create, start, instantiate, discover, identify, duplicate, import, configure, or generate, the cloud-based service instance.

8. The method of claim 7, further comprising establishing the access entity with permissions to access the established cloud service instance separately from establishing the cloud-based service instance.

9. A system for facilitating management of cloud-based service instances, the system comprising:
   one or more servers including one or more hardware processors configured to communicate with at least one multi-tenant computing cloud; and
   computer readable memory storing instructions that, when executed by the one or more hardware processors, cause the one or more servers to:

receive a request to perform an action on a cloud-based service instance hosted in the multi-tenant computing cloud, the request authenticated as originating from a requestor;

determine that the request is allowable by the requestor based on a set of access controls associated with the cloud-based service instance; and enable the requestor, responsive to determining that the request is allowable, to complete the request using an access credential associated with an access entity with permissions to access the cloud-based service instance by forwarding the request to the multi-tenant computing cloud with the access credential associated with the access entity.

10. The system of claim 9, wherein the access entity permissions are restricted to allow access only to the established cloud service instance.

11. The system of claim 9, wherein the cloud-based service instance is associated with a resource pool comprising one or more cloud-based service instances and the access entity permissions are restricted to only accessing cloud-based service instances in the resource pool.

12. The system of claim 9, wherein the cloud-based service instance provides one of a database, a load balancer, a message queue, a communication channel, and data storage.

13. The system of claim 9, wherein the cloud-based service instance is a virtual service provided in the multi-tenant computing cloud.

14. The system of claim 9, the instructions further comprising instructions that, when executed by the one or more hardware processors, cause the one or more servers to:

establish, responsive to determining that the request is allowable by the requestor, a custom access entity with permissions sufficient to perform the request, wherein the requestor is enabled to complete the request using an access credential associated with the custom access entity.

15. The system of claim 9, wherein the instructions further comprising instructions that, when executed by the one or more hardware processors, cause the one or more servers to establish the cloud-based service instance by submitting, by the cloud management service to multi-tenant computing cloud, instructions to create, start, instantiate, discover, identify, duplicate, import, configure, or generate, the cloud-based service instance.

16. The system of claim 15, wherein the instructions further comprising instructions that, when executed by the one or more hardware processors, cause the one or more servers to establish the access entity with permissions to access the established cloud service instance separately from establishing the cloud-based service instance.

17. A method of facilitating management of cloud-based service instances, the method comprising:

receiving, by a cloud management service configured to communicate with a multi-tenant computing cloud, a request for direct access to a cloud-based service instance hosted in the multi-tenant computing cloud, the request authenticated as originating from a requestor;

determining, by the cloud management service, that the request is allowable by the requestor based on a set of access controls associated with the cloud-based service instance; and enabling, by the cloud management service responsive to determining that the request is allowable, the requestor to complete the request using an access credential associated with an access entity with permissions to access the cloud-based service instance by returning to the requestor the access credential associated with the access entity.

18. The method of claim 17, wherein the access entity permissions are restricted to allow access only to the established cloud service instance.

19. The method of claim 17, wherein the cloud-based service instance is associated with a resource pool comprising one or more cloud-based service instances and the access entity permissions are restricted to only accessing cloud-based service instances in the resource pool.

20. The method of claim 17, wherein the cloud-based service instance provides one of a database, a load balancer, a message queue, a communication channel, and data storage.

21. The method of claim 17, wherein the cloud-based service instance is a virtual service provided in the multi-tenant computing cloud.

22. The method of claim 17, further comprising establishing, by the cloud management service, responsive to determining that the request is allowable by the requestor, a custom access entity with permissions sufficient to perform the request, wherein enabling the requestor to complete the request comprises enabling the requestor to complete the request using an access credential associated with the custom access entity.

23. The method of claim 17, further comprising establishing the cloud-based service instance by submitting, by the cloud management service to multi-tenant computing cloud, instructions to create, start, instantiate, discover, identify, duplicate, import, configure, or generate, the cloud-based service instance.

24. The method of claim 23, further comprising establishing the access entity with permissions to access the established cloud service instance separately from establishing the cloud-based service instance.

25. A system for facilitating management of cloud-based service instances, the system comprising:

one or more servers including one or more hardware processors configured to communicate with at least one multi-tenant computing cloud; and computer readable memory storing instructions that, when executed by the one or more hardware processors, cause the one or more servers to:

receive a request for direct access to a cloud-based service instance hosted in the multi-tenant computing cloud, the request authenticated as originating from a requestor;

determine that the request is allowable by the requestor based on a set of access controls associated with the cloud-based service instance; and enable the requestor, responsive to determining that the request is allowable, to complete the request using an access credential associated with an access entity with permissions to access the cloud-based service instance by returning, to the requestor, the access credential associated with the access entity.

26. The system of claim 25, wherein the access entity permissions are restricted to allow access only to the established cloud service instance.

27. The system of claim 25, wherein the cloud-based service instance is associated with a resource pool comprising one or more cloud-based service instances and the access entity permissions are restricted to only accessing cloud-based service instances in the resource pool.

28. The system of claim 25, wherein the cloud-based service instance provides one of a database, a load balancer, a message queue, a communication channel, and data storage.

29. The system of claim 25, wherein the cloud-based service instance is a virtual service provided in the multi-tenant computing cloud.

30. The system of claim 25, the instructions further comprising instructions that, when executed by the one or more hardware processors, cause the one or more servers to:
- establish, responsive to determining that the request is allowable by the requestor, a custom access entity with permissions sufficient to perform the request,
- wherein the requestor is enabled to complete the request using an access credential associated with the custom access entity.

31. The system of claim 25, wherein the instructions further comprising instructions that, when executed by the one or more hardware processors, cause the one or more servers to establish the cloud-based service instance by submitting, by the cloud management service to multi-tenant computing cloud, instructions to create, start, instantiate, discover, identify, duplicate, import, configure, or generate, the cloud-based service instance.

32. The system of claim 31, wherein the instructions further comprising instructions that, when executed by the one or more hardware processors, cause the one or more servers to establish the access entity with permissions to access the established cloud service instance separately from establishing the cloud-based service instance.

* * * * *